Feb. 26, 1935.    R. STUHLMACHER    1,992,403
MILLING MACHINE
Filed Oct. 28, 1932    3 Sheets-Sheet 1

Inventor:
Richard Stuhlmacher
By [signature]
Attorney.

Feb. 26, 1935.  R. STUHLMACHER  1,992,403
MILLING MACHINE
Filed Oct. 28, 1932   3 Sheets-Sheet 2

Inventor:
Richard Stuhlmacher
By [signature]
Attorney.

Patented Feb. 26, 1935

1,992,403

UNITED STATES PATENT OFFICE 1,992,403

MILLING MACHINE

Richard Stuhlmacher, Siegmar, near Chemnitz, Germany, assignor to Wanderer-Werke vorm. Winklhofer & Jaenicke Akt. Ges., Schonau, near Chemnitz, Germany Application October 28, 1932, Serial No. 640,083
In Germany October 31, 1931

8 Claims. (Cl. 90—16)

The present invention relates to milling machine structure of the type in which the milling spindle can be moved also in its longitudinal direction to a certain extent in a slide which is guided in a vertical direction between two standard members.

In machines of this type it is known to provide a sleeve for the milling spindle arranged to slide in the milling slide, which arrangement is subject, however, to various disadvantages. For example, the cylindrical milling spindle sleeve of relatively large diameter cannot be guided and clamped with the desired degree of reliability and its circular cross-section is apt to become non-circular as a result of the clamping actions.

An object of the present invention is to overcome this disadvantage and it consists in eliminating the sleeve for the milling spindle and substituting preferably a cross-slide guided by means of prismatic guide surfaces, in which cross-slide the milling spindle is journalled.

The invention is illustrated by way of example in the accompanying drawings, in which.

Figure 1:
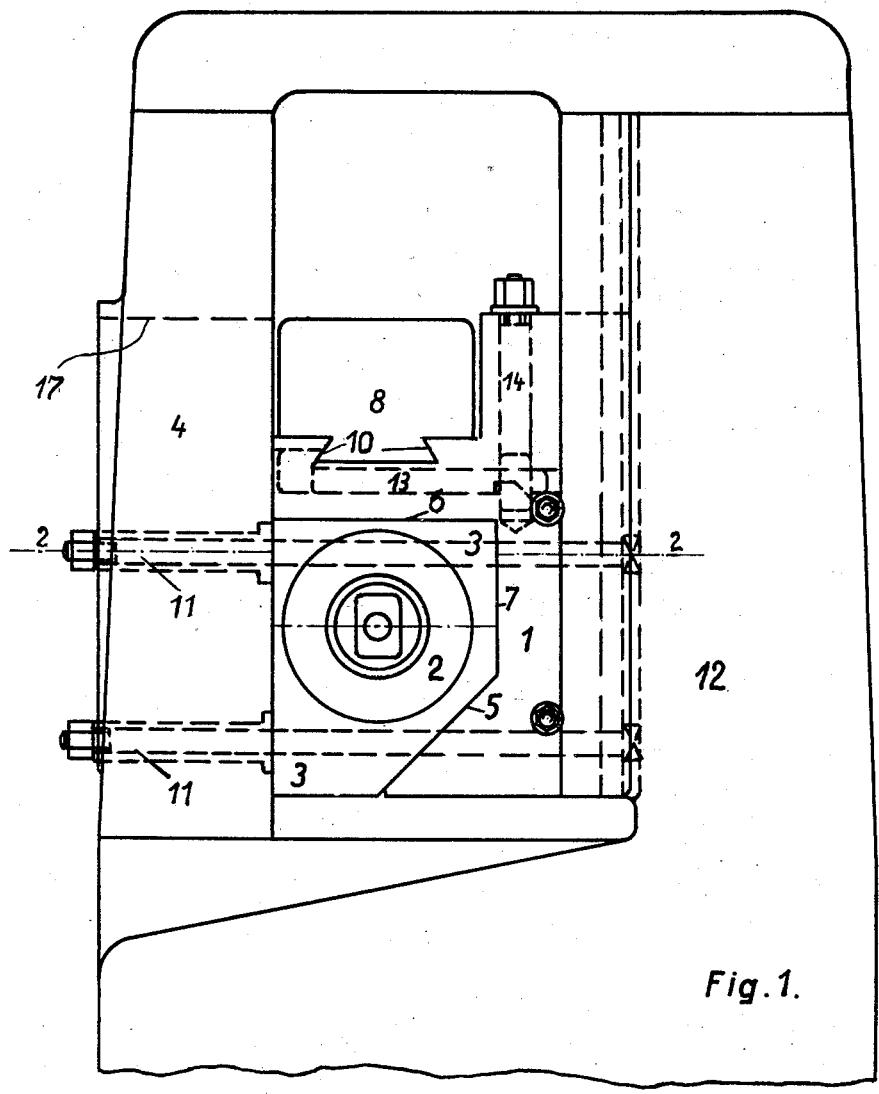
Figure 1 is an elevation of a portion of a milling machine embodying the invention.
Figure 2:
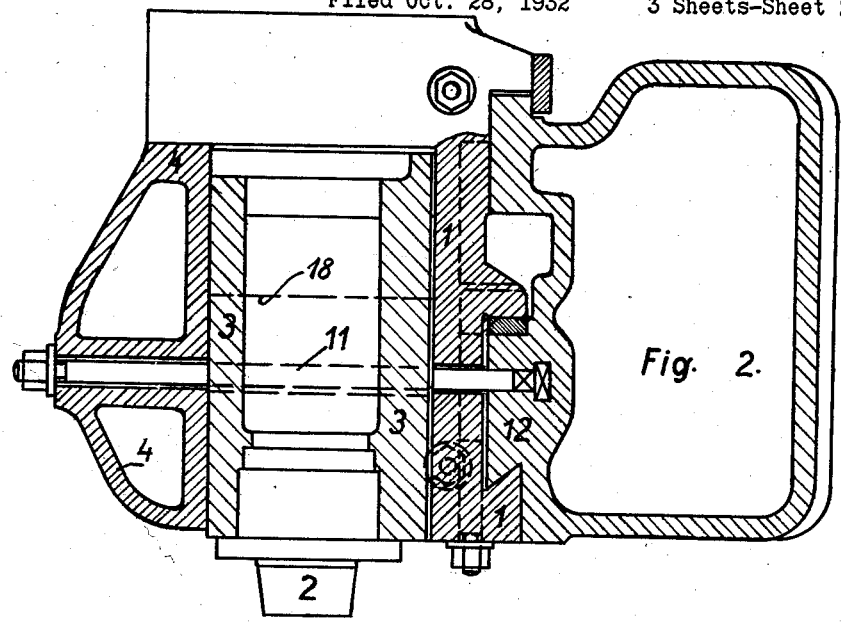
Fig. 2 is a horizontal section taken on line 2—2 of Fig. 1.

The milling slide 1 is mounted for sliding action in a vertical direction between the main standard member 12 of an extremely rugged design and construction, and an auxiliary standard member 4 of slighter construction. The milling spindle 2 is journalled in a cross-slide 3. It is arranged for horizontal sliding motion between the standard member 4 and the large and oblique guide surface 5 of the milling slide. Bolts 11 are provided, the heads of which engage T-shaped slots, in the standard member 12, which bolts extend through the cross-slide 3 and the standard member 4 and serve for clamping the said parts rigidly together. Vertical slots 17 in the standard member 4 through which the bolts 11 pass permit vertical movement of the milling slide, and horizontal slots 18 in the cross-slide 3 permit horizontal displacement of the said slide.

The large guide surfaces 5, 6 and 7 and the cooperating contacting surfaces of the cross-slide 3 are so designed that they all operate simultaneously when the slide is clamped. Since the surface 5 is oblique and the slide 3 thus embraced by guide surfaces, the slide is unyieldingly held against all forces operating in any direction whatever. Owing to its inclination the surface 5 operates under external forces in the manner of a wedge and causes the surfaces 6 and 7 to take up the corresponding component forces.

The milling slide 1 usually carries, in addition to the cross-slide 3, a counterpiece or member 8, which is also capable of sliding and being clamped, serving in known manner for guiding supporting arms in which the outer ends of the milling bar is journalled close up to the milling cutter. The means for guiding and clamping the counterpiece may be of any desired known design. For example, the counterpiece may be clamped by means of hook bolts 13 and 14 having wedging surfaces.

Between the counterpiece and the front end of the removable cross-slide there may be provided in known manner a supporting arm. This arm may be rigidly connected to the cross-slide by clamps or screws or it may be integral therewith or welded thereto, but it is slidably connected to the counterpiece and provided with a releasable clamping device.

Figure 3:
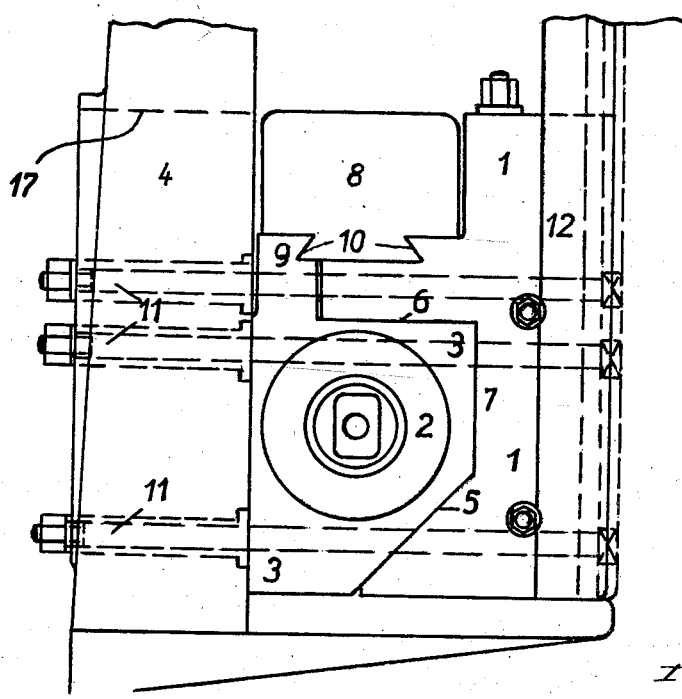
Fig. 3 is a side view similar to Fig. 1 of a modified construction.

The clamping devices for the slidable members, as shown in Fig. 3, may be so designed that they can be simultaneously actuated. The arrangement shown in Fig. 3, for example, makes it possible to simultaneously clamp the cross-slide 3 and the counterpiece 8. The cross-slide 3 has a cheek 9 which engages one of the guide ways 10 of the counterpiece. By means of this cheek, the counterpiece is also clamped when the cross-slide is clamped, the parts being suitably designed for this purpose.

Figure 4:
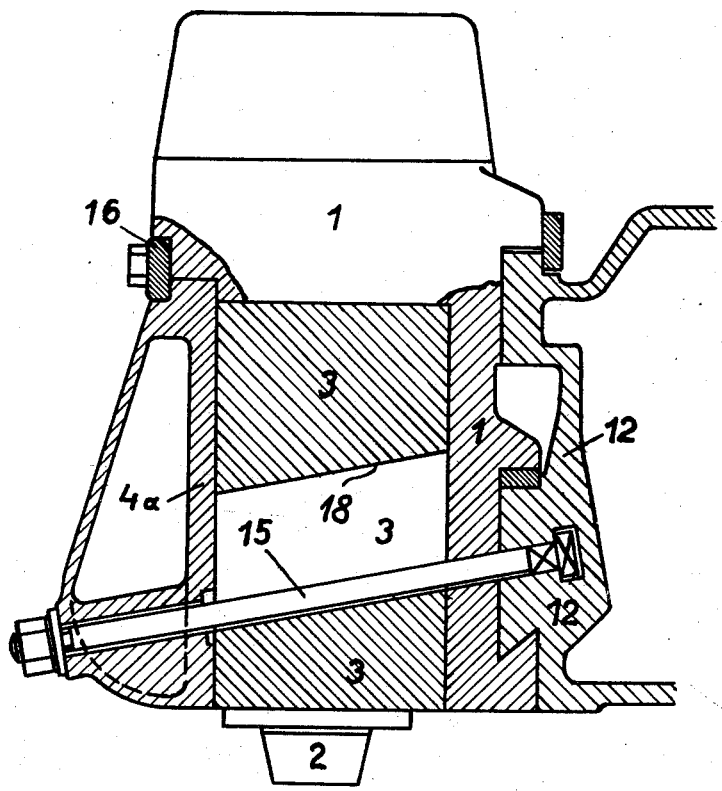
Fig. 4 is a sectional view similar to that of Fig. 2 of a further modification.

In the modification illustrated in Fig. 4 there is a somewhat different arrangement of the bolts for the purpose of obtaining a firm clamping of the cross-slide 3 in direct proximity to the spindle head. When the bolts are arranged at right angles to the axis of the milling spindle, it is not possible, owing to the guides provided in the standard member 12 for the milling slide 1, to bring the clamping bolts close to the spindle head. This difficulty is overcome according to the modification of Fig. 4 by arranging the bolts 15 in a horizontal plane oblique to the axis of the spindle in such a manner that they extend through the front end of the standard member 4a. The standard member 4a is then made with its largest cross-section at this end. In this arrangement the point of application of the force for clamping the slide is considerably nearer the spindle head, so that the milling slide is very firmly and rigidly secured against stresses. In order to prevent the longer free end of the standard member 4a in this modification becoming liable to vibrate, an auxiliary guide strip 16 may be provided for clamping the rear edge of the member 4a.

I claim as my invention:—

1. A milling machine comprising two standard members, a slide movable vertically between the standard members, a cross-slide mounted in the vertically movable slide and movable in its longitudinal direction, a milling spindle journalled in the cross-slide, and clamping means to clamp the cross-slide with the vertically movable slide, said cross-slide being provided with plane guide surfaces for guiding and clamping the cross-slide in the vertically movable slide.

2. A milling machine comprising two standard members, a slide movable vertically between the standard members, a cross-slide mounted in the vertically movable slide and movable in its longitudinal direction, a milling spindle journalled in the cross-slide, said cross-slide being provided with guide surfaces for guiding it in the vertically movable slide, and a plane guide surface on the cross-slide contacting directly with one of the standard members.

3. A machine according to claim 1, in which clamping means are provided for simultaneously clamping the cross-slide and the vertically movable slide together and to one of the standard members.

4. A machine according to claim 1, in which clamping means are provided for simultaneously clamp the cross-slide and the vertically movable slide together and to one of the standard members, said means consisting of bolts guided in vertical guides of the standard members and passing through horizontally extending slots in the cross-slide to permit horizontal movement of the cross-slide.

5. A machine according to claim 1, in which the cross-slide slides and contacts with one of the standard members and has right angled and oblique surfaces slidable on similar surfaces in the vertically movable slide.

6. A milling machine comprising a main standard member, an auxiliary standard member, a slide for a milling spindle slidable vertically for adjustment between the standard members, means for guiding the milling spindle on one of the standard members, said means comprising a dove-tail guide at the side of the standard member near the working end of the milling spindle, and bolts for clamping the slide to the standard members, said bolts being arranged in horizontal planes and obliquely to the milling spindle axis and each bolt having one end located inwardly of the dove-tail guide and the other end substantially opposite the dove-tail guide.

7. A milling machine according to claim 6, in which the standard member traversed by the last-mentioned end of each bolt is reinforced to take the clamping pressure, and auxiliary clamping means are provided at the sides of the standard members remote from the working end of the spindle.

8. A machine according to claim 1, in which a counterpiece is provided on the vertically movable slide and the cross-slide has a cheek engaging a guideway formed on the counterpiece for permitting simultaneous clamping of the counterpiece and cross-slide to the vertically movable slide.

RICH. STUHLMACHER.